April 2, 1935. G. R. BOTT 1,996,610
ANTIFRICTION BEARING
Filed Dec. 5, 1932
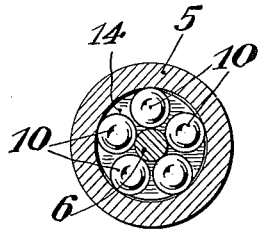
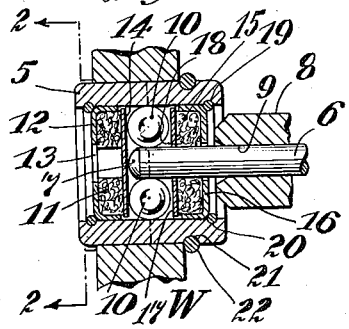
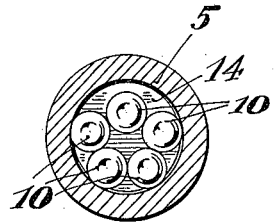
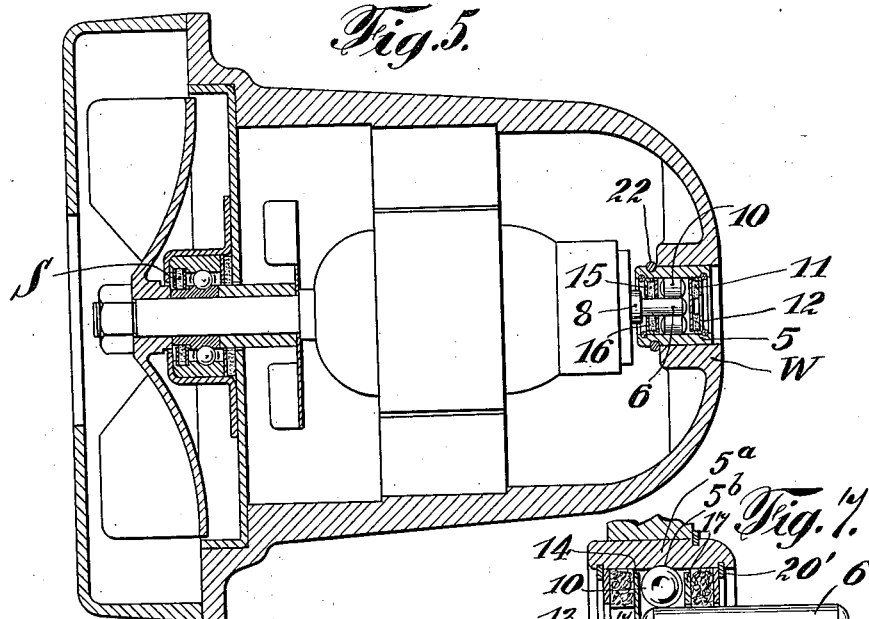
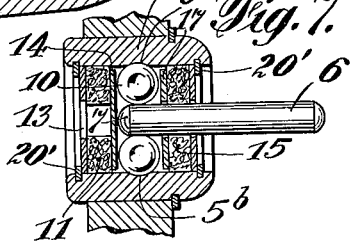
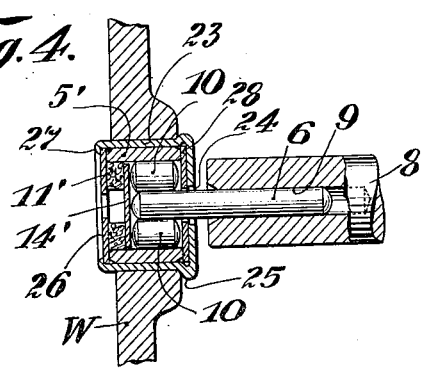
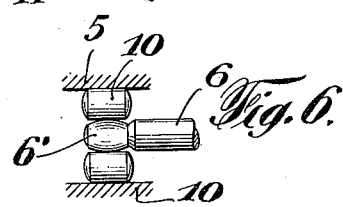
INVENTOR-
George R. Bott
BY
his ATTORNEY- Patented Apr. 2, 1935

1,996,610

UNITED STATES PATENT OFFICE 1,996,610

ANTIFRICTION BEARING

George R. Bott, Stamford, Conn., assignor to Norma-Hoffman Bearings Corporation, Stamford, Conn., a corporation of New York Application December 5, 1932, Serial No. 645,806

5 Claims. (Cl. 308—187)

This invention relates to anti-friction bearings, and has for its primary object and purpose, to provide an extremly small bearing for use in small mechanical units, such as vacuum cleaners and other household appliances where the elimination of friction and smooth, noiseless operation is a prime consideration.

It is another object of the invention to provide a bearing which will satisfactorily meet these essential requirements, and which at the same time will be of very simple and inexpensive construction and capable of installation without necessitating a high degree of skill and in which means is provided for proper and substantially continuous lubrication, whereby wear is reduced to a minimum, and the practically indefinite and efficient operation of the bearing is assured.

The invention also contemplates a bearing possessing certain fundamental characteristics whereby the above noted ends are attained, and which consists essentially in the elimination of raceways for the anti-friction bearing elements necessitating complicated grinding; the use of either balls or rollers having a diameter greater than that of the inner bearing member carried by the shaft or journal; simple and easily applied means for positioning the anti-friction balls or rollers within the outer bearing member or ring; and means for minimizing resistance from axial thrusts or positioning loads which also acts to positively supply lubricant to the anti-friction bearing elements.

With the above and other objects in view, the invention consists in the improved anti-friction bearing, and in the form, construction and relative arrangement of its several parts, as will be hereinafter more fully described, illustrated in the accompanying drawing and subsequently incorporated in the subjoined claims.

In the drawing wherein I have shown several simple and practical embodiments of the invention, and in which similar reference characters designate corresponding parts throughout the several views,—

Figure 1 is a sectional view on an enlarged scale, showing a preferred practical embodiment of my present improvements;

Fig. 2 is a sectional view taken on the line 2—2 of Fig. 1;

Fig. 3 is a view similar to Fig. 2, the inner bearing member or pin being removed;

Fig. 4 is a sectional view similar to Fig. 1, showing a modified form of the device;

Fig. 5 is a sectional view of a small vacuum cleaner motor illustrating one practical application of the present invention;

Fig. 6 is a detail view showing an alternative form of the inner bearing member or pin; and Fig. 7 is a sectional view similar to Fig. 1 showing another modified form of the device.

Referring in detail to the drawing, and for the present more particularly to Figs. 1 to 3 thereof, my new bearing includes an outer bearing member or ring 5 which is hardened and ground to cylindrical form. This ring may be ground to its outer diameter on a centerless grinder, and since its inner diameter is a straight uninterrupted bore, it will be evident that this bearing ring or member can be produced at very small cost.

The inner rotating member of the bearing preferably consists of an elongated pin 6 of small diameter, also made of hardened bearing steel stock and having one of its ends rounded or convex as indicated at 7. This bearing pin may be manufactured as a separate element by the bearing manufacturer, or it may be integrally formed on the end of the shaft 8 to be supported by the bearing by turning down the shaft end to the proper diameter. This is a simple operation which can be readily carried out by the user of the bearing. When the pin 6 is furnished with the bearing to the user, the latter has only to provide the bore 9 in the end of the shaft 8 of the requisite length, by means of a simple drill, and then drive one end of the pin 6 therein with an interference fit to a definite position with respect to the end of the shaft. The bearing pins 6, in view of their small diameter in relation to the length, may be aptly referred to as needles. These needle bearing elements may be very rapidly and inexpensively produced on a centerless grinder at very small expense in comparison to that incident to the production of the usual inner bearing ring having a ball receiving race.

The anti-friction bearing elements 10 in the form of either balls or rollers, as indicated in Figs. 1 and 4, have a diameter which slightly exceeds the diameter of the needle or pin 6. In small bearings of this character where the loads are small and high anti-friction quality is most desirable, balls will be used while in other cases where load possibilities are to be considered, the roller type of anti-friction element will be employed. Such rollers may be economically produced from discarded or scrap balls of a given size which will provide a roller of accurate length.

With the balls in the position shown in Fig. 3, for instance, the needle 6 is insertable at one side thereof, as the right-hand side of Figs. 4 or 7. When the needle has been inserted its free end terminates at a position substantially in a plane of the bearing members at the left-hand side thereof, Fig. 7. This termination need not be exactly in the plane of the bearings as shown, since a slight increase or decrease in the length would also be within the invention called for, but the terminating free end of the needle is substantially in line with the plane passing through the adjacent side of the bearing members.

The bearing balls or rollers are assembled within the outer ring or member 5 after first positioning within one end of said member the absorbent annular washer 11 of felt or other suitable material which serves as a lubricant reservoir. This felt washer is preferably arranged within a flanged or cup-shaped disc 12 of thin sheet steel having a central opening 13 therein, and through which, when necessary, lubricant may be supplied to said felt washer. A thin sheet steel washer plate 14 having a diameter somewhat less than the internal diameter of the bearing member 5 is engaged upon the inner face of the felt washer 11. After the balls or rollers have been assembled within the member 5, a similar felt washer 15 with its holding cup 16 and the sheet steel washer plate 17 are inserted within the other end of said member. This washer plate 17 has a central opening 18 therein of somewhat greater diameter than the diameter of the bearing pin 6. Any suitable means may be employed for the purpose of holding the felt and metal washer assemblies against outward movement through the ends of the bearing member 5, and in this instance, I have shown said member provided at its opposite ends with internal grooves 19 to receive the split locking rings 20. The said bearing member 5 may also be provided in its outer surface near one end thereof with a similar groove 21 to receive the locking ring 22, whereby the bearing as a whole is retained in proper relation to the wall or other part W in which it is mounted.

It will be evident from the above description, that the small diameter of the bearing member or pin 6, has a minimum of contact with the surfaces of either the balls or roller bearing elements which are of larger diameter than said pin. Therefore, frictional resistance is reduced to a minimum. Owing to this relatively large diameter of the balls or rollers, it is evident, as will be seen from reference to Fig. 3 of the drawing, that before mounting in operative position, or when the pin 6 is removed, the balls or rollers cannot move outwardly through the opening in the washer plate 17 from their assembled positions within the bearing ring or member 5. The inner diameter of said bearing member is such that when the pin 6 is in position within the bearing, the individual balls or rollers have rotating contact with the periphery of said pin and with the inner surface of the ring or member 5 in clearance relation to each other.

The felt washers and the metal washer plates locate the rotating bearing elements within the member 5. The washer plate 14 takes the thrust or positioning load of the pin 6, the rounded or convex end 7 of which contacts with the center of said plate with a minimum of resistance. Axial pressure against said washer plate tends to compress the felt washer 11, so that in the alternate compression and expansion of this felt washer, a pumping action occurs, forcing the lubricating oil inwardly around the outer edge of the plate 14 and upon the inner surface of the member 5 and the surfaces of the anti-friction bearing elements. Thus adequate and constant lubrication of the bearing during operation is assured. However, when necessary, the supply of lubricant carried by the washer 11 may be replenished by the insertion of the oil can spout through the opening 13 of the follower cup 12.

In Fig. 5 of the drawing, I have shown a practical application of this new bearing to a motor such as is used in connection with vacuum cleaners and other small mechanical units. At the right hand end of the motor shaft, the new bearing is shown in full size, and it will be evident therefrom that such a small bearing unit can be easily and quickly assembled in the end of the motor housing. The bearing illustrated at the left hand end of the motor shaft and adjacent to the fan, having raceways in the inner and outer bearing members and balls assembled in a cage or retainer, is of standard form, with the exception of the grease seal indicated at S which forms the subject matter of my copending application for patent Serial No. 482,226, filed September 16, 1930. This bearing, however, is comparatively expensive and the use of two bearings of this type will materially add to the manufacturing and selling cost of such mechanical units. At the opposite end of the motor shaft, however, it is permissible to use a bearing of my new construction in which an inner bearing member in the form of the relatively small diameter pin as an extension of the motor shaft and the elimination of ball receiving raceways and retainers, effects an appreciable economy. In view of the substantial absence of excessive friction, with adequate lubrication, which results in substantially noiseless operation and long life, my new bearing satisfactorily meets the requirements of economy and efficiency in its application to such vacuum cleaner motors, radio generator units, drink mixers, small pulleys, scales and other mechanical appliances operating under comparatively small loads.

In Fig. 4 of the drawing, I illustrate a modified form of my new bearing, in which the outer bearing ring or member 5' is incased within a sheet metal shell or cartridge 23. One end of this cartridge is substantially closed with the exception of the central opening 24 which receives the bearing pin 6, and is provided with an annular peripheral bead or shoulder 25 which constitutes a stop or abutment against the wall W in which the bearing unit is mounted and subserves the purpose of the locking ring 22 above referred to. In this case, the felt washer 11' and metal washer or disc 14' are arranged within one end of the bearing ring or member 5'. A washer plate or disc 26 extends over the outer surface of the felt washer 11' and at its outer edge is held in bearing contact against the end edge of the ring or member 5' by the inwardly turned or crimped end edge of the sheet metal cartridge or shell 23. A thin metal washer plate indicated at 28 is also preferably interposed between the other end edge of the bearing member 5' and the end wall of the shell 23. This type of my new bearing operates in substantially the same manner as that above described. The additional cost of the incasing shell or cartridge 23 for the bearing, is to some extent compensated for by the elimination of the locking rings 20 and 22 and the necessity of providing the grooves in the outer bearing member to receive these rings.

In the embodiment illustrated in Figure 2, there are shown five anti-friction bearings, each held in the outer race ring 5. These form a central opening or bore, formed by drawing a circle tangential to each member. The needle bearing member 6, has a diameter substantially equal to the diameter of this tangential circle, allowing for the usual tolerances. Instead of the balls shown in Fig. 2, rollers such as shown in Fig. 4, can be used. The diameter of the tangential circle in each case is smaller than the diameter in any one of the anti-friction members which have all substantially the same diameter.

In Fig. 7 of the drawing, I have illustrated another modification which in certain cases may be found desirable. As shown, in this instance, the outer bearing ring or member 5ª is provided on its inner face substantially centrally thereof with a raceway 5ᵇ. This raceway is quite shallow and need only be of such depth as will prevent lateral shifting movement of the balls in either direction out of proper alignment. The metal and felt washer assemblies as above described are mounted within the annular bearing member 5 at opposite sides of the balls, but in this case instead of using the wire rings of circular cross sectional form for holding said assemblies in place, and for retaining the bearing ring 5ª in its mounted position, I have shown the flat expansible and contractible split metal rings 20' and 22' respectively which seat in rectangular grooves in the inner and outer faces of the bearing member 5ª. The same central elongated bearing pin or needle of small diameter relative to the balls, as above referred to, is engaged at one of its ends between and with the series of balls and projects axially from one side of the bearing. It will be understood however, that in each of the described embodiments of the invention, this central bearing pin or needle may also extend axially in the other direction through coinciding openings in the metal washer plate 14 and the felt lubricant holder 11. The user of bearings of the kind described herein may stock the same in any desired quantities, and the central bearing pins or needles 6 may be supplied as separate elements whenever required by the bearing manufacturer.

While the user of my new bearing in applying the same needs only to drill the axial bores 9 in the ends of the shaft and is not troubled by small tolerances or machine accuracies, these bores should however be drilled as nearly as possible in perfect axial alignment. However, even if such alignment is not perfect, the effect thereof would not preclude the use of the bearing, since the misalignment is not magnified in degree, particularly as to the contact of the rolling bearing elements with the pin or shaft extension. If desired, even such slight misalignment might be rendered innocuous by the use of the inner bearing member or pin, such as that illustratd in Fig. 6 of the drawing wherein the end of the pin having contact with the rolling anti-friction elements, is more or less oval in shape having the longitudinally extending convex peripheral surface 6'. Also, this form of the bearing pin provides single point contact of the pin with the cylindrical surfaces of the roller elements, instead of linear contact throughout the length of such cylindrical surfaces, whereby the same degree of frictionless operation would be secured as in the use of balls.

There are five balls shown and these have a diameter larger than the diameter of the central opening formed by placing the balls in the race ring.

From the foregoing description considered in connection with the accompanying drawing, it will be seen that I have devised a small size anti-friction bearing which will be very desirable in numerous applications thereof, and particularly where greatest economy with highest efficiency and long life of the bearing are an essential consideration. I have herein referred to several very simple and practical embodiments of the invention. It is, however, obvious that various other developments of the fundamental principle thereof consisting essentially in the use of an inner bearing member, which is of the same or less diameter than the rolling anti-friction elements, are easily possible. Therefore, it is to be understood that the privilege is reserved of embodying this essential feature of the present disclosure in all other alternative structural forms as may be fairly incorporated within the spirit and scope of the appended claims.

I claim:

1. In an anti-friction bearing, an annular bearing member having an inner cylindrical surface, a sheet metal shell enclosing said bearing member having an end wall provided with a central opening, a plurality of anti-friction elements within said bearing member having free rolling contact on the cylindrical surface thereof, and adapted for supporting contact with the cylindrical surface of a bearing pin of less diameter than the individual elements insertable through said opening, said shell at the periphery of said end wall being formed to provide an abutment flange for positioning the bearing relative to a supporting structure, lubricant supply means including a part subject to axial thrust from said bearing pin to supply lubricant to said anti-friction elements, and means secured to the other end of said shell and preventing outward displacement of the lubricant supply means from said annular bearing member.

2. An anti-friction bearing comprising a self-contained assemblage of an enclosing cup-shaped shell having a central needle shaft bearing opening, and bent ends, an outer race ring therein, a plurality of anti-friction members, within the race ring, and of a number to form a central opening of a diameter less than the diameter of any of said members, an axial needle shaft bearing passing through said needle shaft bearing opening of the shell, a circular plate of substantially the same diameter as the bore of the race ring disposed against said anti-friction members and in contact with the end of the shaft, and a lubricant means at the side of the plate other than said shaft bearing, said parts within the shell being held therein by the bent ends of the shell, and said plate acting to move lubricant into the bearings upon the axial vibration of the needle shaft bearing.

3. An anti-friction bearing comprising an outer race ring, a plurality of anti-friction bearing members disposed circumferentially therein, a lubricant containing means within the race ring adjacent said members, a plate interposed between said lubricant means and said anti-friction bearings, and of substantially the same diameter as the diameter of the race ring, and an axial bearing member within the central opening of the bearing members, having its end in contact with the plate, whereby upon the axial vibration of the axial bearing member the central part of the plate is moved and the outer part of the plate permits lubricant to pass from the lubricant means to the bearing members, upon the pressure exerted upon the central part of the plate.

4. In combination, a self-contained assemblage of an enclosing cup-shaped shell having a central shaft bearing opening at one side thereof and bent ends at the other side thereof, a plurality of anti-friction members within the shell, a lubricating pump including a lubricant holder and a plate in contact therewith within said shell disposed at the bent end portion of the shell, and an axial shaft passing through the shaft opening of the shell and extending to contact with the central part of the plate, whereby upon the axial vibration of the shaft the central part of the plate is moved and the lubricant caused to pass around the peripheral portion of the plate from the lubricant holder to the anti-friction members.

5. An anti-friction bearing comprising an outer race ring, five anti-friction bearing members of substantially the same diameter disposed circumferentially therein and contacting therewith and with each other, providing when so disposed a central opening, the circle tangentially contacting with each of said members and forming said opening being of a diameter smaller than the diameter of any one of the aforesaid bearing members, a needle bearing member the diameter of which is substantially the same as that of said tangential circle, said needle bearing member acting as an inner race for the aforesaid bearing members, said needle bearing member having its free end terminating at the exterior sides of the aforesaid bearing members opposite to the side in which the needle is inserted, and at a point proximate to a plane substantially tangent to one of exterior sides of the aforesaid bearing members, and means for holding the aforesaid anti-friction members within said outer race ring.

GEORGE R. BOTT.